Patented June 7, 1938

2,119,899

UNITED STATES PATENT OFFICE 2,119,899

PRODUCING ALIPHATIC ALCOHOLS OF HIGH MOLECULAR WEIGHT

Hermann Zorn, Ludwigshafen - on - the - Rhine, Friedrich Vogel, Mannheim, and Heinrich Wolter, Amsdorf, Germany, assignors to I. G. Farbenindustrie Aktiengesellschaft, Frankfort-on-the-Main, Germany No Drawing. Application August 13, 1934, Serial No. 739,634. In Germany August 17, 1933

13 Claims. (Cl. 260—156)

This invention relates to the production of aliphatic alcohols of high molecular weight preferably those having at least 6 or at least 12 carbon atoms from low molecular aliphatic aldehydes or mixtures containing the said alcohols.

We have found that aliphatic alcohols of high molecular weight can be obtained in a very advantageous manner by condensing saturated or unsaturated aldehydes of low molecular weight by means of organic substances having a condensing action, hydrogenation while employing hydrogenation catalysts and in the presence of condensing agents being effected simultaneously or subsequently.

As initial materials may be mentioned for example acetaldehyde, propionaldehyde, butyraldehyde, stearic aldehyde, and crotonaldehyde as well as substitution products of the said aldehydes, as for example aldehydes containing halogen. According to this invention, probably a kind of aldol condensation first takes place between the aldehydes, two, three or more molecules of aldehyde taking part to form a straight or branched chain which then yields alcohols of high molecular weight by hydrogenation, in some cases after splitting off water.

Catalysts having a condensing action which are suitable for the purposes of this invention are especially organic nitrogenous compounds, as for example secondary amines, such as diethylamine or dibutylamine, piperidine, hydrogenated quinoline compounds, such as decahydroquinoline or hydrogenated naphthoquinoline, piperazine, morpholines, and pyrroles, as for example proline, and pyrrolidines or mixtures of these substances. The said organic basic substances are employed in the hydrogenation step in the free state, i, e, not in the form of their salts. These condensing agents, especially when employing crotonaldehyde, yield valuable alcohols of high molecular weight by hydrogenation. The said catalysts having a condensing action may be activated for example by oxides and hydroxides of metals of the second and third groups of the periodic system, as for example calcium, strontium, magnesium or aluminium hydroxide, or salts having a basic reaction, as for example disodium phosphate, sodium carbonate or sodium acetate. By suitable selection of catalysts or special mixtures it is possible to influence the reaction as regards the final products formed; thus for example by employing only organic catalysts, products are obtained in which alcohols corresponding to the aldehydes employed as initial materials preponderate as compared with the alcohols of high molecular weight, whereas by the simultaneous employment of metal oxides of the said kind, the alcohols of high molecular weight are obtained in a preponderating amount.

The catalysts having a condensing action are generally speaking employed in amounts of up to about 5 per cent, advantageously from 0.5 to 1 per cent, calculated with reference to the aldehyde. The condensation is carried out at ordinary or slightly elevated temperature, as for example at from 20° to 40° C. and as a rule not above 80° C. The addition of the hydrogenation catalysts is preferably effected directly before the hydrogenation. In many cases it is advantageous to carry out the condensation and also the hydrogenation in the presence of inert solvents, as for example cylohexane. The hydrogenation may be effected at atmospheric or increased pressure, preferably at temperatures between 100° and 200° C. and while employing the usual hydrogenation catalysts, as for example nickel, cobalt or copper catalysts. The catalysts may also be employed precipitated on carrier substances, such as active carbon, kieselguhr or silica gel, or also on the metal oxides employed having an activating action. The condensation of aldehydes of low molecular weight and the hydrogenation of the condensation products may be carried out in one operation or in two stages.

The alcohols obtained are suitable as solvents and as initial materials for the preparation of artificial compositions, assistants for the textile industry and pharmaceutical products.

The following examples will further illustrate the nature of this invention but the invention is not restricted to these examples. The parts are by weight.

Example 1

12 parts of calcium hydroxide and 5 parts of hydrogenated beta-naphthoquinoline are added to 500 parts of crotonaldehyde. The mixture, after being allowed to stand for six days, is subjected to hydrogenation in the presence of a cobalt catalyst at 150° C. under a pressure of 200 atmospheres. A good yield of a product is obtained which contains butyl and octyl alcohols and also about 55 per cent of a mixture of monohydric and polyhydric alcohols of high molecular weight.

By working without an addition of calcium oxide but under otherwise similar conditions, a reaction product is obtained containing about 39 per cent of a mixture of alcohols of high molecular weight.

Example 2

15 parts of a nickel catalyst, precipitated on silica gel, containing about 10 per cent of metallic nickel and 4 parts of decahydroquinoline are introduced into 200 parts of acetaldehyde. The mixture is hydrogenated at 150° C. under a pressure of 200 atmospheres of hydrogen. A reaction product is obtained in good yields which by fractional distillation in vacuo yields 49 parts of ethyl alcohol, 21 parts of butylene glycol and 30 parts of a mixture of higher alcohols.

What we claim is:—

1. The process of producing mixtures of aliphatic alcohols containing high molecular alcohols which comprises condensing an aliphatic aldehyde by means of a free nitrogenous organic base and then hydrogenating the condensation product in the presence of the said condensing agent with the simultaneous addition of a hydrogenation catalyst.

2. The process of producing mixtures of aliphatic alcohol containing high molecular alcohols which comprises condensing a low molecular aliphatic aldehyde by means of a free nitrogenous organic base and simultaneously hydrogenating the condensation product in the presence of the said condensing agent and a hydrogenation catalyst.

3. The process of producing mixtures of aliphatic alcohols containing high molecular alcohols which comprises condensing a low molecular aliphatic aldehyde by means of a mixture of a free nitrogenous organic base and an inorganic compound having a basic reaction and then hydrogenating the condensation product in the presence of the said condensing agent with the simultaneous addition of a hydrogenation catalyst.

4. The process of producing mixtures of aliphatic alcohols containing high molecular alcohols which comprises condensing a low molecular aliphatic aldehyde by means of free nitrogenous organic base and then hydrogenating the condensation product in the presence of the said condensing agent with the simultaneous addition of a hydrogenation catalyst.

5. The process of producing mixtures of aliphatic alcohols containing high molecular alcohols which comprises condensing an unsaturated low molecular aliphatic aldehyde by means of a free nitrogenous organic base and then hydrogenating the condensation product in the presence of the said condensing agent with the simultaneous addition of a hydrogenation catalyst.

6. The process of producing mixtures of aliphatic alcohols containing high molecular alcohols which comprises condensing acetaldehyde by means of a free nitrogenous organic base and simultaneously hydrogenating the condensation product in the presence of the said condensing agent with the simultaneous addition of a hydrogenation catalyst.

7. The process of producing mixtures of aliphatic alcohols containing high molecular alcohols which comprises condensing crotonaldehyde by means of a free nitrogenous organic base and simultaneously hydrogenating the condensation product in the presence of the said condensing agent with the simultaneous addition of a hydrogenation catalyst.

8. The process of producing mixtures of aliphatic alcohols containing high molecular alcohols which comprises condensing acetaldehyde by means of free decahydroquinoline and simultaneously hydrogenating the condensation product in the presence of the said condensing agent while employing a nickel catalyst.

9. The process of producing mixtures of aliphatic alcohols containing high molecular alcohols which comprises condensing crotonaldehyde by means of free hydrogenated beta-naphthoquinoline and then hydrogenating the condensation product in the presence of the said condensing agent while employing a cobalt catalyst.

10. High molecular aliphatic alcohols obtainable by condensation of a low molecular aliphatic aldehyde by means of a free nitrogenous organic base and hydrogenation of the condensation product in the presence of the said condensing agent with simultaneous addition of a hydrogenation catalyst, the said alcohols containing a higher number than twice the carbon atoms of the said aldehyde.

11. Mixtures of aliphatic alcohols obtainable by condensation of a low molecular aliphatic aldehyde by means of a nitrogenous organic base and hydrogenation of the condensation product in the presence of the said condensing agent with simultaneous addition of a hydrogenation catalyst, the said mixture containing high molecular aliphatic alcohols with a higher number than twice the carbon atoms of the said aldehydes.

12. Mixtures of aliphatic alcohols obtainable by condensation of acetaldehyde by means of a nitrogenous organic base and hydrogenation of the condensation product in the presence of the said condensing agent with simultaneous addition of a hydrogenation catalyst, the said mixture containing high molecular aliphatic alcohols with at least 6 carbon atoms.

13. Mixtures of aliphatic alcohols obtainable by condensation of crotonaldehyde by means of a nitrogenous organic base and hydrogenation of the condensation product in the presence of the said condensing agent with simultaneous addition of a hydrogenation catalyst, the said mixture containing high molecular aliphatic alcohols with at least 12 carbon atoms.

HERMANN ZORN.
FRIEDRICH VOGEL.
HEINRICH WOLTER.